(12) United States Patent
Yahagi et al.

(10) Patent No.: US 9,160,078 B2
(45) Date of Patent: Oct. 13, 2015

(54) CORNER REFLECTOR

(71) Applicant: IHI Aerospace Co., Ltd., Tokyo (JP)

(72) Inventors: Jun Yahagi, Tokyo (JP); Ryo Kaneko, Gunma (JP); Yoshiaki Shinoda, Tokyo (JP); Mitsuhiko Terashima, Tokyo (JP)

(73) Assignee: IHI AEROSPACE CO., LTD., Tokyo (JP)

( * ) Notice: Subject to any disclaimer, the term of this patent is extended or adjusted under 35 U.S.C. 154(b) by 0 days.

(21) Appl. No.: 14/150,336

(22) Filed: Jan. 8, 2014

(65) Prior Publication Data
US 2014/0125507 A1 May 8, 2014

Related U.S. Application Data

(63) Continuation of application No. PCT/JP2012/061012, filed on Apr. 25, 2012.

(30) Foreign Application Priority Data

Jul. 8, 2011 (JP) .................................. 2011-151379

(51) Int. Cl.
*H01Q 15/20* (2006.01)
*H01Q 15/18* (2006.01)
(Continued)

(52) U.S. Cl.
CPC .................. *H01Q 15/163* (2013.01); *F41J 2/00* (2013.01); *F41J 9/08* (2013.01); *F42B 12/70* (2013.01); *G01S 7/38* (2013.01); *H01Q 15/18* (2013.01); *H01Q 15/20* (2013.01)

(58) Field of Classification Search
CPC ..... H01Q 15/14; H01Q 15/16; H01Q 15/161; H01Q 15/163; H01Q 15/18; H01Q 15/20; G01S 7/02; G01S 7/38; F41H 11/02; F41J 2/00; F41J 9/08; F41J 9/10; F42B 12/02; F42B 12/36; F42B 12/56; F42B 12/70; G02B 5/12; G02B 5/122; G02B 5/124
USPC ............ 342/1–11; 343/700 R, 907, 912–916; 359/515, 529–534, 536, 538
See application file for complete search history.

(56) References Cited

U.S. PATENT DOCUMENTS 2,778,010 A * 1/1957 Leonard ............................ 342/8
3,103,662 A * 9/1963 Gray et al. ........................ 342/8
(Continued)

FOREIGN PATENT DOCUMENTS

CA      2 209 288 A1    5/1997
GB        758 090 A     9/1956
(Continued)

OTHER PUBLICATIONS

International Search Report issued in corresponding application No. PCT/JP2012/061012 completed Jul. 5, 2012 and mailed Jul. 17, 2012.
(Continued)

Primary Examiner — Bernarr Gregory
(74) Attorney, Agent, or Firm — Griffin & Szipl, P.C.

(57) ABSTRACT

A corner reflector includes: annular hollow balloons having flexibility and airtightness, and when gas is supplied therein, the annular hollow balloons expand with pressure of the gas to be an annular shape; and a radio wave reflection film having an outer edge part that is attached to the annular hollow balloons so that expansion of the annular hollow balloons makes the radio wave reflection film unfold over a plane of the annular shape. The three of the annular hollow balloons are provided so as to be mutually orthogonal after expansion. Binding members are attached to outer faces of the annular hollow balloons, the binding members being for preventing expansion of the annular hollow balloons beyond their limit volume.

9 Claims, 2 Drawing Sheets

(51) Int. Cl.
*H01Q 15/16* (2006.01)
*F41J 2/00* (2006.01)
*G01S 7/38* (2006.01)
*F41J 9/08* (2006.01)
*F42B 12/70* (2006.01)
*H01Q 15/00* (2006.01)

(56) References Cited

U.S. PATENT DOCUMENTS

| | | | | |
|---|---|---|---|---|
| 3,153,235 | A | * | 10/1964 | Chatelain ............... 342/8 |
| 3,217,325 | A | * | 11/1965 | Mullin ............... 342/8 |
| 3,224,001 | A | * | 12/1965 | Radnofsky al. ............... 342/8 |
| 3,276,017 | A | * | 9/1966 | Mullin ............... 342/8 |
| 3,283,328 | A | * | 11/1966 | Wood ............... 342/8 |
| 3,671,965 | A | * | 6/1972 | Rabenhorst et al. ............... 342/8 |
| 4,673,934 | A | * | 6/1987 | Gentry et al. ............... 342/8 |
| 4,733,236 | A | * | 3/1988 | Matosian ............... 342/7 |
| 4,740,056 | A | * | 4/1988 | Bennett ............... 359/529 |
| 4,901,081 | A | * | 2/1990 | Bain et al. ............... 342/8 |
| 5,285,213 | A | * | 2/1994 | Tusch ............... 343/915 |
| 5,398,032 | A | * | 3/1995 | Tucker et al. ............... 342/9 |
| 5,920,294 | A | | 7/1999 | Allen ............... 343/912 |
| 5,953,159 | A | * | 9/1999 | Shellans ............... 359/515 |
| 5,969,660 | A | * | 10/1999 | Veazey ............... 342/8 |
| 6,300,893 | B1 | * | 10/2001 | Schaff et al. ............... 342/10 |
| 6,384,764 | B1 | * | 5/2002 | Cumberland ............... 342/8 |
| 6,570,545 | B1 | * | 5/2003 | Snow et al. ............... 343/915 |
| 6,864,824 | B2 | | 3/2005 | Garon et al. |
| 6,864,858 | B1 | * | 3/2005 | Miller et al. ............... 343/915 |
| 7,224,322 | B1 | * | 5/2007 | Ghaleb et al. ............... 343/915 |
| 2003/0137441 | A1 | | 7/2003 | Garon et al. |

FOREIGN PATENT DOCUMENTS

| | | | |
|---|---|---|---|
| GB | 812376 | A | 4/1959 |
| GB | 2189079 | A | 10/1987 |
| GB | 2276036 | A * | 9/1994 ............ H01Q 15/20 |
| JP | 53-47299 | A | 4/1978 |
| JP | 04-355388 | A | 12/1992 |
| JP | 09-190585 | A | 7/1997 |
| JP | 2002-96795 | A | 4/2002 |
| JP | 2011-127956 | A | 6/2011 |
| WO | 2005/036941 | A2 | 4/2005 |

OTHER PUBLICATIONS

International Search Report issued in co-pending U.S. Appl. No. 14/150,431, completed Jul. 26, 2012 and mailed Aug. 7, 2012.
Office Action issued Feb. 2, 2015 in co-pending U.S. Appl. No. 14/150,431.
Supplementary European Search Report issued in corresponding application No. 12810991 on Feb. 12, 2015.
Supplementary European Search Report issued in related application 12811123 on Feb. 6, 2015.
Notice of Allowance issued in co-pending related U.S. Appl. No. 14/150,431 on May 27, 2015.

* cited by examiner

CORNER REFLECTOR

This is a Continuation Application in the United States of International Patent Application No. PCT/JP2012/061012 filed Apr. 25, 2012, which claims priority on Japanese Patent Application No. 2011/151379, filed Jul. 8, 2011. The entire disclosures of the above patent applications are hereby incorporated by reference.

TECHNICAL FIELD

The present invention relates to a corner reflector to reflect radio waves and function as a decoy or the like.

BACKGROUND ART

Patent Literature 1, for example, describes a corner reflector. The corner reflector in Patent Literature 1 has the structure of FIG. 1. As in FIG. 1, the corner reflector includes eight sets of three mutually orthogonal radio wave reflection films 21. The thus configured corner reflector allows a radio wave incident thereon from any direction to be reflected in its incident direction.

For instance, as shown in FIG. 2, both of a radio wave A and a radio wave B can be reflected by the mutually orthogonal radio wave reflection films 21 in their incident directions.

A corner reflector is ejected from a flying object, a ship or the ground, and then unfolds in the air or on the water to be the shape of FIG. 1. To this end, the corner reflector, for example, has a balloon 23 as in the example of FIG. 1. This balloon 23 expands to be a spherical shape. The radio wave reflection films 21 are attached inside the balloon 23 so that the expansion of the balloon makes each radio wave reflection film 21 unfold as in FIG. 1. In the example of FIG. 1, a cylinder 25 provided supplies the inside of the balloon 23 with gas, whereby the balloon expands to be a spherical shape.

Such a configuration of the corner reflector, when it unfolds in the air, for example, and receives a radio wave from tracking radar or a radar seeker of a missile, reflects the radio wave in the incident direction as in FIG. 2. Thus, the corner reflector can be a decoy of the radar.

Other prior art documents of the present application include the following two patent literatures.

CITATION LIST

Patent Literature

PTL 1: Japanese Patent Publication Laid-open No. H04 (1992)-355388
PTL 2: Japanese Patent Publication Laid-open No. H09 (1997)-190585

SUMMARY OF INVENTION

Technical Problem

Such a corner reflector desirably unfolds quickly. In order to expand the balloon for unfolding of the corner reflector, gas is supplied into the balloon. The expansion of the aforementioned balloon to be a spherical shape requires a large amount of gas to be supplied. This means that it takes time for the corner reflector to unfold. The corner reflector capable of unfolding quickly is then requested.

It is an object of the present invention to provide a corner reflector that can unfold quickly.

Solution to Problem

In order to fulfill the object, the present invention provides a corner reflector including: an annular hollow balloon having flexibility and airtightness, and when gas is supplied therein, the annular hollow balloon expands with pressure of the gas to be an annular shape; and a radio wave reflection film having an outer edge part that is attached to the annular hollow balloon so that expansion of the annular hollow balloon makes the radio wave reflection film unfold over a plane of the annular shape. Three of the annular hollow balloons are provided so as to be mutually orthogonal after expansion, and binding members are attached to outer faces of the annular hollow balloons, the binding members being for preventing expansion of the annular hollow balloons beyond their limit volume.

In one preferable embodiment of the present invention, the binding members are provided so as to surround the annular hollow balloons in an outer peripheral direction of the annular hollow balloons that is orthogonal to a circumferential direction of the annular shape.

Preferably the radio wave reflection films are cloths made of conductive fiber, and the binding members and the radio wave reflection films are jointed.

Advantageous Effects of Invention

Such a corner reflector according to the present invention includes: an annular hollow balloon having flexibility and airtightness, and when gas is supplied therein, the annular hollow balloon expands with pressure of the gas to be an annular shape; and a radio wave reflection film having an outer edge part that is attached to the annular hollow balloon so that expansion of the annular hollow balloon makes the radio wave reflection film unfold over a plane of the annular shape. Three annular hollow balloons are provided so as to be mutually orthogonal after expansion. This configuration requires simply expanding the annular hollow balloons, and so the amount of gas that is necessary to expand the annular hollow balloons can be reduced. As a result, the corner reflector can unfold quickly.

Additionally, binding members are attached to outer faces of the annular hollow balloons, which prevent the expansion of the annular hollow balloons beyond their limit volume, and so the internal pressure of the annular hollow balloons in the expansion state can be increased. As a result, the annular hollow balloons can be made thinner, and so the annular hollow balloons can be made lighter and the dimensions of the annular hollow balloons in the folding state also can be made small.

DESCRIPTION OF EMBODIMENTS

Figure 1:
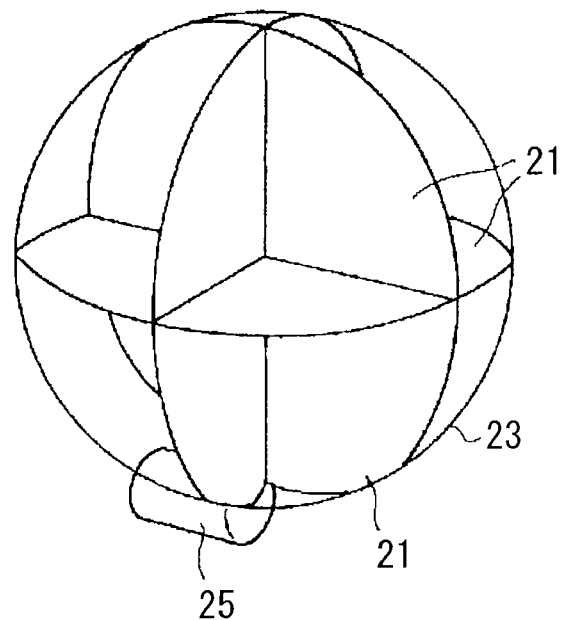
FIG. 1 shows the structure of a corner reflector of Patent Literature 1.
Figure 2:
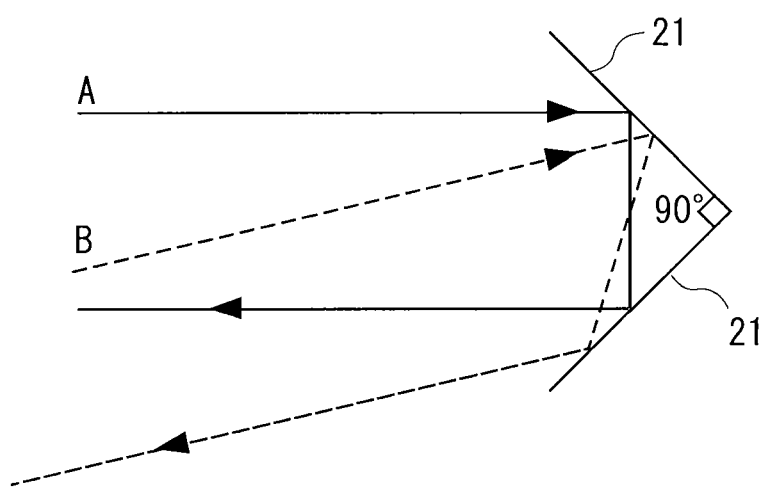
FIG. 2 describes the action of a corner reflector.

The following describes preferable embodiments of the present invention, with reference to the drawings, in which like reference numerals designate like parts to avoid the duplicate description.

Figure 3:
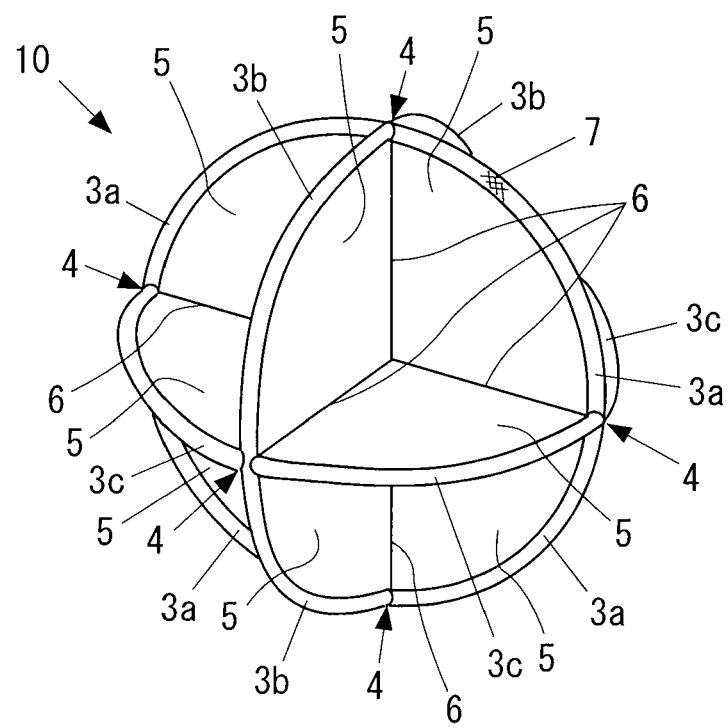
FIG. 3 is a perspective view of a corner reflector according to one embodiment of the present invention.

FIG. 3 is a perspective view of a corner reflector 10 according to one embodiment of the present invention. As shown in FIG. 3, the corner reflector 10 includes annular hollow balloons 3a, 3b and 3c, radio wave reflection films 5 and binding members 7.

The annular hollow balloons 3a, 3b and 3c have flexibility and airtightness, and when gas is supplied therein, they expand with the gas pressure to be an annular shape. The three annular hollow balloons 3a, 3b and 3c are assembled so that, in their expansion state, their annular planes become mutually orthogonal. Preferably the three annular hollow balloons 3a, 3b and 3c are assembled so that chords (joint part 6 described later) dividing the annular hollow balloons 3a, 3b and 3c into halves become mutually orthogonal. FIG. 3 shows that the three annular hollow balloons 3a, 3b and 3c expand to be an annular shape. Preferably the three annular hollow balloons 3a, 3b and 3c internally communicate with each other. Such a communicating part preferably resides at a part 4 where the annular hollow balloons 3a, 3b and 3c mutually intersect. Such communication enables the three annular hollow balloons 3a, 3b and 3c to expand with gas supplied from one part to the inside of the annular hollow balloons.

The annular hollow balloons 3a, 3b and 3c may be made of a plastic film such as polyolefin, nylon or polyvinyl chloride.

The radio wave reflection films 5 have outer edge parts that are attached to the annular hollow balloons 3a, 3b and 3c so that the expansion of the annular hollow balloons 3a, 3b and 3c makes the radio wave reflection films 5 unfold over the annular planes of the annular hollow balloons. That is, the expansion of the annular hollow balloons 3a, 3b and 3c makes the radio wave reflection films 5 unfold over annular planes of the annular hollow balloons. As shown in FIG. 3, the radio wave reflection films 5 of the present embodiment include eight sets of the radio wave reflection films 5, each set including three radio wave reflection films 5 that are mutually orthogonal. In FIG. 3, lines 6 are joint parts of the plurality of radio wave reflection films 5.

The surface of the radio wave reflection films 5 is made of a conductive material that reflects radio waves.

The binding members 7 are attached to the outer faces of each of the annular hollow balloons 3a, 3b and 3c, and prevent the expansion of the annular hollow balloons beyond their predetermined limit volume. Herein, the "limit volume" refers to the volume of the annular hollow balloons when a hollow tube making up each of the annular hollow balloons 3a, 3b and 3c has a predetermined maximum diameter.

Each binding member 7 in this example is binding cloth 7, which may be a net-shaped, a belt-shaped or a string-shaped member (cloth, net or string).

Figure 4:
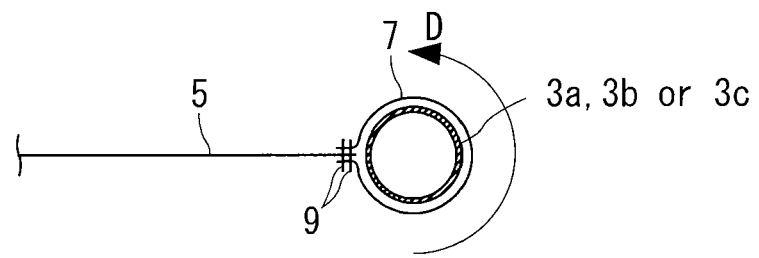
FIG. 4 is a partial cross-sectional view of a corner reflector taken along a plane that is orthogonal to the annular circumferential direction of annular hollow balloons.

FIG. 4 is a partial cross-sectional view of the corner reflector 10 taken along a virtual plane that is orthogonal to the annular circumferential direction of the annular hollow balloons 3a, 3b and 3c. The binding cloths 7 are made of a material that does not have a property of reflecting radio waves (e.g., polyester, nylon or silk). That is, the binding cloths 7 are made of a material transmitting radio waves. This can prevent radio waves from being reflected by the annular hollow balloons 3a, 3b and 3c, thus preventing degradation of the radio waves reflective performance of the corner reflector 10, which may be degraded when the radio wave reflection films 5 have a part that is not illuminated radio waves.

Preferably the binding cloths 7 are wound around the annular hollow balloons 3a, 3b and 3c in the outer peripheral direction (the direction of the arrow indicated with D in the drawing) of the annular hollow balloons 3a, 3b and 3c that is orthogonal to the annular circumferential direction. That is, the binding cloths 7 surround the annular hollow balloons 3a, 3b and 3c in the outer peripheral direction of the annular hollow balloons 3a, 3b and 3c. In this case, each binding cloth 7 is more preferably wound around in the outer peripheral direction of the annular hollow balloons 3a, 3b and 3c so that the face thereof is in contact with the annular hollow balloons 3a, 3b and 3c.

Such binding cloths 7 may extend in the annular circumferential direction along the annular hollow balloons 3a, 3b and 3c so as to circle around in the circumferential direction. Alternatively a plurality of pieces of the binding cloths 7 may be provided at intervals in the annular circumferential direction. Still alternatively, the binding cloths 7 may be configured to partially cover the annular hollow balloons 3a, 3b and 3c.

According to the present embodiment, the radio wave reflection films 5 are cloths made of conductive fiber. In this case, the radio wave reflection films 5 and the binding cloths 7 are preferably jointed by sewing fiber 9 as shown in FIG. 4. Thus the radio wave reflection films 5 are attached to each of the annular hollow balloons 3a, 3b and 3c.

The joint of the radio wave reflection films 5 with the binding cloths 7 are preferably by suturing using the sewing fiber 9, which may be jointed by other means. Instead of the binding cloths 7, a member in the shape of a net, a belt or a string (cloth, net or string) may be wound around the annular hollow balloons 3a, 3b and 3c.

The conductive fiber may be nylon or polyester fiber coated with a metal film (copper, silver or the like), for example. The sewing fiber 9 is made of a material not having a radio wave reflective property (e.g., nylon thread).

The thus configured corner reflector 10 in a folding state is ejected from a ship (warship) or from the ground in the air, and then a gas supplying device not illustrated that is attached to the corner reflector 10 supplies gas into the annular hollow balloons 3a, 3b and 3c, whereby the corner reflector 10 unfolds as in FIG. 3. The gas supplying device may be a gas cylinder, a gas generator using pyrotechnic or the like, and may operate so as to supply gas into the annular hollow balloons 3a, 3b and 3c at desired timing.

Such a corner reflector 10 unfolded in the air then becomes a tracking target of a radar seeker of a missile due to radar reflection from the corner reflector 10. In this way, the corner reflector 10 can be a decoy against the missile.

Such a corner reflector 10 according to the present embodiment includes: annular hollow balloons 3a, 3b and 3c having flexibility and airtightness, and when gas is supplied therein, they expand with the gas pressure to be an annular shape; and radio wave reflection films 5 having an outer edge part that is attached to the annular hollow balloons 3a, 3b and 3c so that expansion of the annular hollow balloons 3a, 3b and 3c makes the radio wave reflection films 5 unfold over annular planes. Herein, three annular hollow balloons 3a, 3b and 3c are provided so as to be mutually orthogonal after expansion. This configuration requires simply expanding the annular hollow balloons 3a, 3b and 3c, and so the amount of gas that is necessary to expand the annular hollow balloons 3a, 3b and 3c can be reduced. As a result, the corner reflector can unfold quickly.

Additionally, the binding cloths 7 attached to the outer faces of the annular hollow balloons 3a, 3b and 3c prevent the expansion of the annular hollow balloons 3a, 3b and 3c beyond their limit volume, and so the internal pressure of the annular hollow balloons 3a, 3b and 3c in the expansion state can be increased. As a result, the annular hollow balloons 3a, 3b and 3c can be made thinner, and so the annular hollow balloons 3a, 3b and 3c can be made lighter and the dimensions of the annular hollow balloons 3a, 3b and 3c in the folding state also can be made small.

Since the internal pressure of the annular hollow balloons 3a, 3b and 3c in the expanding state can be increased, the structural strength of the corner reflector 10 also can be increased.

The present invention is not limited to such an embodiment, and it may be modified in various ways without departing from the scope and spirit of the invention.

The sewing fiber 9 may be omitted. In this case, the radio wave reflection films 5 may be attached to the annular hollow balloons 3a, 3b and 3c via the binding cloths 7 with means other than the sewing fiber 9.

The corner reflector 10 of the present invention may be used for purposes other than a decoy. For instance, the corner reflector 10 of the present invention may be used to notice where the missing person is as in Patent Literature 2.

REFERENCE SIGNS LIST 3a, 3b, 3c: annular hollow balloons, 4: intersecting part, 5: radio wave reflection film, 6: joint part, 7: binding member (binding cloth), 9: sewing fiber, 10: corner reflector

The invention claimed is:

1. A corner reflector to reflect a radio wave, comprising:
a plurality of annular hollow balloons, each annular hollow balloon having flexibility and airtightness, and when gas is supplied therein, the annular hollow balloon expands with pressure of the gas to be an annular shape; and
a radio wave reflection film having an outer edge part that is attached to the annular hollow balloon so that expansion of the annular hollow balloon makes the radio wave reflection film unfold over a plane of the annular shape, wherein
wherein the plurality of annular hollow balloons comprises three annular hollow balloons provided so as to be mutually orthogonal after expansion, and
binding members made of a material without a radio wave reflective property attached to outer faces of each annular hollow balloons, and
wherein the binding members are disposed to prevent expansion of the annular hollow balloons beyond a limit volume, the limit volume being defined by a maximum diameter of each expanded annular hollow balloon.

2. The corner reflector according to claim 1, wherein the binding members are provided so as to surround the outer surface of the annular hollow balloons in an outer peripheral direction of the annular hollow balloons that is orthogonal to a circumferential direction of the annular shape.

3. The corner reflector according to claim 2, wherein the radio wave reflection films are cloths made of conductive fiber, and the binding members and the radio wave reflection films are jointed.

4. The corner reflector according to claim 3, wherein the binding members are made of a material transmitting a radio wave.

5. The corner reflector according to claim 2, wherein the binding members are made of a material transmitting a radio wave.

6. The corner reflector according to claim 1, wherein the radio wave reflection films are cloths made of conductive fiber, and the binding members and the radio wave reflection films are jointed.

7. The corner reflector according to claim 6, wherein the binding members are made of a material transmitting a radio wave.

8. The corner reflector according to claim 1, wherein the binding members are made of a material transmitting a radio wave.

9. The corner reflector according to claim 1, wherein each binding member is binding cloth, or a net-shape, a belt-shape or a string-shape member.

* * * * *